(12) United States Patent
Brey et al.

(10) Patent No.: US 7,792,597 B2
(45) Date of Patent: Sep. 7, 2010

(54) CONTROL SYSTEMS AND METHOD USING A SHARED COMPONENT ACTUATOR

(75) Inventors: Thomas M. Brey, Cary, NC (US); Wesley Michael Felter, Austin, TX (US); Sumeet Kochar, Apex, NC (US); Charles Robert Lefurgy, San Marcos, TX (US); Malcolm Scott Ware, Austin, TX (US); Christopher Landon Wood, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 11/769,832

(22) Filed: Jun. 28, 2007

(65) Prior Publication Data

US 2009/0006901 A1    Jan. 1, 2009

(51) Int. Cl.
*G05B 13/02* (2006.01)
(52) U.S. Cl. .................. 700/34; 700/299; 700/300; 713/322
(58) Field of Classification Search .................. 700/34, 700/299, 300; 318/268; 713/322; 714/47
See application file for complete search history.

(56) References Cited

U.S. PATENT DOCUMENTS

| 4,612,844 | A | 9/1986 | Byford |
| 5,670,856 | A | 9/1997 | Le et al. |
| 6,216,059 | B1 | 4/2001 | Ierymenko |
| 6,643,128 | B2 | 11/2003 | Chu et al. |
| 6,694,196 | B2 | 2/2004 | Tuttle et al. |
| 7,206,210 | B2 | 4/2007 | Harnett et al. |
| 7,434,171 | B2 * | 10/2008 | Clapper ...................... 713/322 |
| 2005/0041446 | A1 * | 2/2005 | Harnett et al. ................ 363/95 |
| 2006/0181232 | A1 * | 8/2006 | Oljaca et al. ................ 318/268 |

FOREIGN PATENT DOCUMENTS

| CN | 1397861 A | 2/2003 |
| CN | 1839533A A | 9/2006 |

OTHER PUBLICATIONS

Chinese Office Action dated Jan. 29, 2010, 2008101317668, 8 pages.

* cited by examiner

*Primary Examiner*—Albert DeCady
*Assistant Examiner*—Steven R Garland
(74) *Attorney, Agent, or Firm*—Cynthia G. Seal; Jeffrey L. Streets (57) ABSTRACT

In one embodiment, a control system supports an unlimited number of feedback control loops all sharing control of a component. A component performance rate or "speed" is used as a common metric for negotiating control of the component. Each control loop continuously monitors a system parameter it is tasked with regulating, compares it to a setpoint for that system parameter, and "requests" a speed in relation to the deviation of the associated system parameter from the corresponding setpoint. A controller receives the requested speeds as dynamic inputs and selects one of the requested speeds according to predefined selection logic. The controller communicates the selected speed to an actuator, which causes the component to operate at the selected speed. In this manner, the control system in effect negotiates control of the component in a way that ensures that all of the system parameters are being managed within safe limits.

12 Claims, 4 Drawing Sheets

CONTROL SYSTEMS AND METHOD USING A SHARED COMPONENT ACTUATOR

BACKGROUND OF THE INVENTION

1. Field of the Invention

The present invention relates to control systems for regulating computer systems and other electronic systems.

2. Description of the Related Art

Control systems are used to regulate variable parameters of electronic systems. For example, control systems have been devised to regulate environmental variables such as temperature and sound level in a computer system, as well as performance-related variables such as electrical power and current consumption of the system. Generally, a control system monitors the current state of the system and compares it to the desired state of the system. The deviation from the desired state, often referred to as the error, is used to compute a new control input to the system. The term "control loop" may be used to describe the path of the signals that form this feedback. Frequently, a component of a computer system may affect multiple system parameters. For example, a processor's activity level may influence temperature, current flow, power consumption, and even (indirectly, through its effect on fan speed) sound levels in a computer system. Thus, multiple control systems may each seek to regulate the same component, which can present conflicting demands to the component.

If the component accepts any request or instruction to operate at given level, then the component performance may vary dramatically according to the latest input received. This can lead to unstable control loops for each of the control systems or management entities and various undesirable results. For example, if the control systems do not adequately manage the temperature of the processor, a built-in thermal protection mechanism can cause a catastrophic shut-down of the entire chip.

An improved control system and method are therefore needed for resolving potentially competing demands of multiple control loops in an electronic system. It would be desirable if the control system and method provided individual control of system components giving consideration to multiple control loops.

SUMMARY OF THE INVENTION

The invention includes systems, methods, and software for regulating system parameters of an electronic system using a shared component actuator. The shared component actuator controls a variable performance rate of an electronic component, such as a processor, fan, or voltage regulator. One embodiment provides an automatic control system including an electronic component having a variable component performance rate. Each of a plurality of control loops regulate an associated one of a plurality of system parameters. Each control loop includes a control logic module for determining a target value for the component performance rate according to the amount of deviation between a sensed value of a system parameter and a setpoint established for the same system parameter. A shared component actuator is in communication with each control logic module and compares the target values according to a common metric. The component actuator dynamically selects one of the target values according to a predefined selection criterion and operates the electronic component at the selected value of the component performance rate.

A second embodiment provides a method of regulating or controlling a plurality of parameters of an electronic system including a plurality of electronic components having a variable performance rate. Each of the plurality of system parameters may be used to determine a target value for the performance rate of each component. For any particular system parameter, the target value of the performance rate for a given component is typically determined in relation to the amount of deviation between a sensed system parameter and a setpoint associated with that system parameter. The resulting target values for a given component are compared using a common metric, such as a scale relating the performance rate of the component to a nominal maximum performance rate of the component. For each component, only one of the target values is dynamically selected according to a predefined selection criterion, such as by selecting the smallest target value. The electronic component is then operated according to the selected value of the performance rate.

A third embodiments is a computer program product comprising a computer usable medium including computer usable program code for regulating a plurality of system parameters of an electronic system including a plurality of electronic components. The computer program product includes computer usable program code for determining, for each of the plurality of system parameters, a target value for the performance rate of each component, where the target value may be determined in relation to the amount of deviation between the value of a sensed system parameter and a setpoint associated with the same system parameter; computer usable program code for comparing the target values for a given component using a common metric; computer usable program code for dynamically selecting one of the target values according to a predefined selection criterion; and computer usable program code for operating the electronic component according to the selected value of the performance rate.

Other embodiments, aspects, and advantages of the invention will be apparent from the following description and the appended claims.

DETAILED DESCRIPTION

The present invention recognizes that, in many electronic systems, a plurality of regulated system parameters are each affected (whether directly or indirectly) by the performance rates of the same components. For example, in a computer system, the system parameters to be regulated are typically measurable physical properties of the computer system, such as power consumption, current flow, temperature, and sound level, each of which is directly or indirectly influenced by the speed at which a processor is operating. An embodiment of a control system according to the invention, therefore, exploits this recognition by using a component performance rate or "speed" as a common language or metric for negotiating control of a component. The control system may support an unlimited number of feedback control loops all sharing control of a component actuator used to control the speed of the component. Each control loop monitors the system parameter that it is tasked with regulating, compares it to a setpoint for that system parameter, and "requests" a speed in relation to the deviation of the associated system parameter from the corresponding setpoint. A controller receives the requested speeds from the control loops as dynamic inputs. Additional, non-dynamic speed selection inputs may also be provided to the controller, such as a static speed requested by a fixed power management module. The controller selects one of the requested speeds according to predefined selection logic. The selection logic may be, for example, to select the smallest requested speed at any given moment. The controller communicates the selected speed to the shared actuator, which causes the component to operate at the selected speed. In this manner, the control system in effect negotiates control of the component in a way that ensures that all of the system parameters are being managed within safe limits.

The control system provides a fast and deterministic negotiation of control over the component, which promotes system stability. In one aspect, a processor may be controlled at least partially "out-of-band," i.e., the control algorithm for requesting speeds, selecting one of the requested speeds, and enforcing the requested speed on the processor may be implemented at least partially outside of the processor being controlled, any applications running on the processor, and the operating system (OS). The steps of this control algorithm may be performed out-of-band, for example, on a baseboard management controller (BMC), which is separate from the processor being controlled and may be controlled by self-contained firmware, rather than the OS or any applications running thereon. The speed of some types of processors may be switched out-of-band, so that the control algorithm may be performed entirely out-of-band, including the step of enforcing the selected speed on the processor. The speed of some other types of processors may only be switched by the processor itself, such that at least the step of enforcing the selected speed on the processor may have to be performed in-band.

Figure 1:
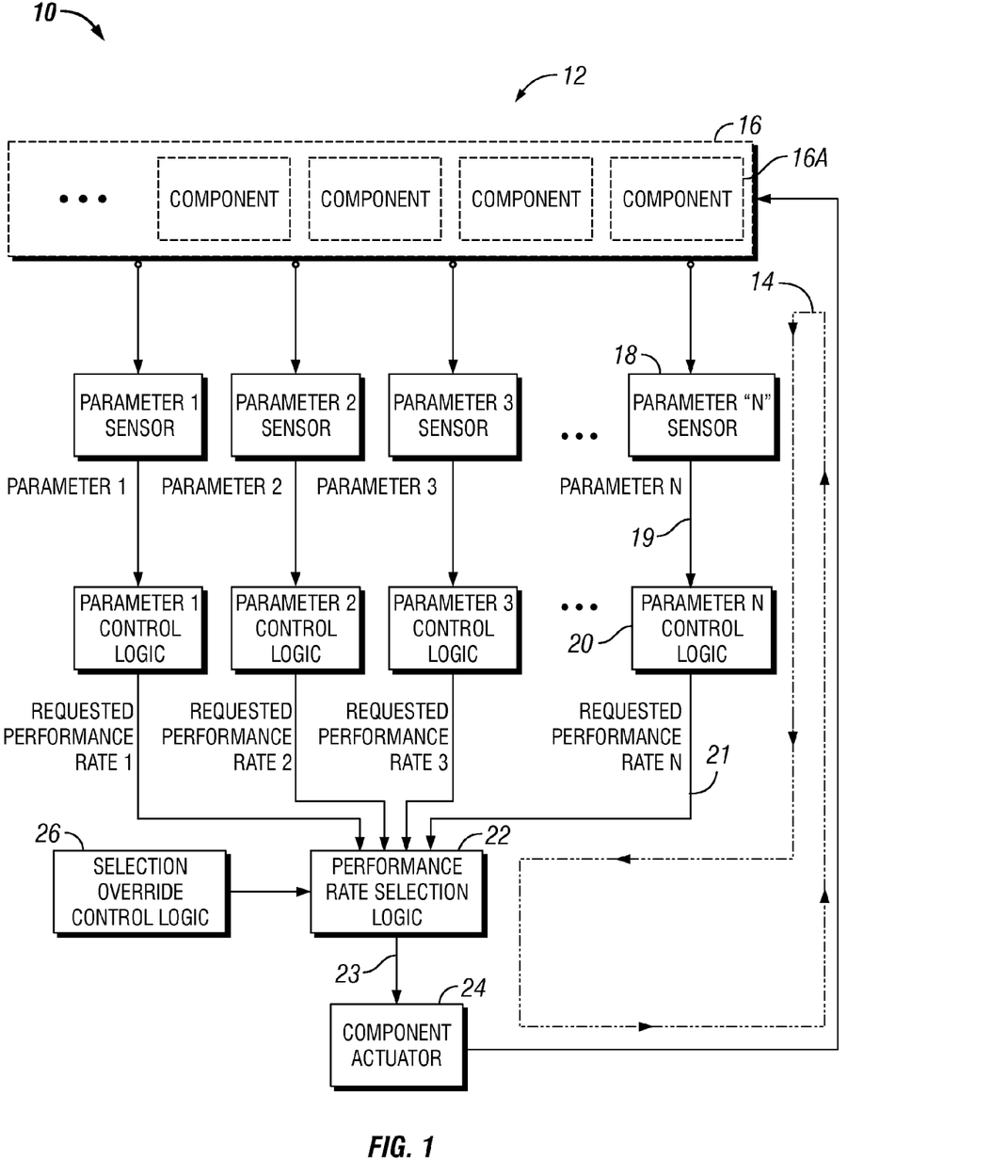
FIG. 1 is a schematic diagram of a generalized embodiment of a control system according to the invention for regulating system parameters of a multi-component electronic system.

FIG. 1 is a schematic diagram of a generalized embodiment of a control system 10 according to the invention for regulating a plurality of system parameters of an electronic system 12. The electronic system 12 has a plurality of electronic components 16. Though more than one of the components may influence the system parameters, FIG. 1 focuses on how a particular component 16A may be controlled in the process of regulating the plurality of system parameters. The system parameters to be regulated are typically measurable physical properties such as power consumption, current flow, temperature, and sound level. The system parameters may include parameters specific to the component 16A such as power consumption, current flow, or temperature associated with the component 16A, parameters of the entire electronic system 12 such as sound level in proximity to the electronic system 12, or parameters of other components or subsystems of the electronic system 12 that are at least affected by the performance rate of the component 16A.

Each system parameter is regulated by one of a corresponding plurality of control loops that, in effect, negotiate control of the component 16A of the electronic system 12. An Nth control loop (traced out schematically as loop 14) for regulating a "parameter N" is mapped out by way of example. The Nth control loop 14 is governed by a control loop algorithm or "control logic" module 20. The Nth control loop 14 seeks to regulate the Nth system parameter according to the Nth control loop logic module 20, at least in part by controlling the performance rate of the component 16A. The control loop logic module 20 inputs a requested component performance rate or speed to a performance rate selection logic module 22. Each of the other control loops also uses a respective control logic module to input a requested speed which, if selected by the selection logic module 22, will be sent in a signal 23 to a component actuator 24 that controls the component 16A at the selected speed. For example, if the speed requested by the parameter N control logic module 20 is selected from among the speeds requested by all of the control logic modules, the signal 23 is sent to the component actuator 24 to operate the component 16A at the speed requested by the Nth control logic module 20. One of ordinary skill may relate the example of the Nth control loop 14 to the other control loops in the control system 10 that share control over the component actuator 24 to regulate the other (N−1) system parameters.

The generalized control system 10 includes N sensors 18 (labeled from "Parameter 1 Sensor" to "Parameter N sensor") for sensing the respective N system parameters. Each sensor 18 outputs a signal 19 in relation to the dynamic value of the associated parameter. Each signal 19 is input to the control loop logic 20 included with the respective control loop. The control loop logic 20 compares the sensed parameter to a setpoint, which is a predefined target value of the parameter. The setpoint can be a point value that the parameter may vary above and below as the control logic module 20 continuously works to maintain the setpoint. Alternatively, the setpoint can be an upper or lower limit that the control logic module 20 works to maintain the parameter below or above, respectively. The control loop logic 20 determines a deviation between the sensed value of the associated system parameter and the setpoint or limit for that system parameter. The control loop logic 20 then determines a target value for the performance rate (i.e. the "requested speed") of the component 16A according to this deviation.

The requested speed may be selected proportionally to the deviation between the sensed value of the system parameter and the associated setpoint. More specifically, the control loop logic 20 may select the requested speed of the component performance rate such that a deviation between the present value and the requested speed of the component performance rate is proportional to the deviation between the sensed value of the system parameter and the associated setpoint or limit. A proportionality constant may, for example, be predetermined for the parameter to be controlled. The requested speed of the component performance rate may be selected such that the deviation between the requested speed and present value of the component performance rate is equal to the proportionality constant times the deviation between sensed value of the system parameter and the setpoint. The predetermined proportionality constant may be derived, for example, by performance testing prior to placing the generalized control system 10 and the electronic system 12 into service.

Each control loop logic 20 selects the requested speed for the component performance rate and outputs a signal 21 representative of the requested speed to a shared performance rate selection algorithm or "selection logic module" 22. By inputting all of the requested speeds to the shared selection logic module 22, each control loop, in effect, is submitting a request to set the performance rate of the component 16A at a particular value that would result in a desired regulation of the associated system parameter. Typically, however, not all of the requested speeds input to the selection logic module 22 will be the same. More frequently, all of the requested speeds determined by the respective control loop logics 22 will be different at any given instant. The selection logic module 22 is, therefore, tasked with selecting one requested speed from among the different requested speeds it receives according to the predefined selection logic module 22. The selection logic module 22 then informs a component actuator 24 of the selected speed. A component actuator, generally, is a device, software object, or combination thereof, which converts an input value to a change in physical system properties. In this embodiment, the component actuator 24 sets the performance rate of the component 16A according to the selected speed received from the selection logic module 22. For example, the component 16A may be a processor or group of processors that is throttled by the component actuator 24 at a selected target speed.

The predefined selection criterion for selecting one of the requested speeds is typically system-specific. In one implementation of the control system 10, the selection logic module 22 may be configured to automatically select the lowest requested speed by default. For example, if the electronic system 12 were a computer system, wherein multiple control loops compete for control of a speed of a processor (the component 16A), the selection logic module 22 may, by default, select the lowest performance rate (processor speed) from among the requested processor speeds at any given moment. Selecting the lowest requested speed in this case may desirably cause the component 16A to err on the side of underperforming, to ensure that none of the system parameters (e.g. temperature, current flow, or power consumption) exceed safe operating limits. In another implementation of the control system 10, selecting the largest requested speed by default may be desired. For example, wherein the electronic system 12 is a computer system and wherein the component 16A to be controlled is a cooling fan, selecting the largest performance rate (fan speed) by default may ensure that all of the computer subsystems are cooled sufficiently, even if some of the subsystems would be cooled satisfactorily even at lower fan speeds. Relatively simple selection logic such as "select the lowest speed" or "select the highest speed" are desirable because they are computationally inexpensive and result in fast and deterministic control over the component 16A. Due to this efficiency, the control system may be implemented fully "out-of-band" of an operating system, to avoid tying up operating system resources.

Occasionally it may be desirable to override the speed selection logic 22. A selection override control logic module 26 is provided for emergency control of the speed of the component 16A. This override may be beneficial for the stable control of the system where, for example, a parameter sensor has malfunctioned. Without an override, the control loop logic associated with the parameter sensor might request a speed that was unnecessarily restrictive or otherwise ineffective.

Transforming the system parameter values desired by the control loops to the common metric of "speed" according to the invention results in a fast and deterministic solution for resolving the competing demands of the various control loops. The requested speed values may further be "normalized," if necessary, such that each requested speed conforms to a common standard. In one example, all of the requested speed values may be simply expressed as a numerical (unitless) value, such as on a scale from 0 to 100, where 0 represents the minimum possible activity level of the component 16A and a value of 100 represent 100% of the component's nominal capacity. The speed resolution may be relatively fine, such as 0.1% adjustments or 1000 discrete speeds for selection. In one example, a processor having a nominal speed of 5 GHz, a speed of "100" may correspond to operation of the processor at 5 GHz. In some instances, a component may exceed its nominal operating capacity. For example, a 5 GHz processor may be overclocked to obtain effective processor speeds in excess of 5 GHz. A speed of greater than 100 may be used to indicate operation of the component above its nominal operating capacity.

Figure 2:
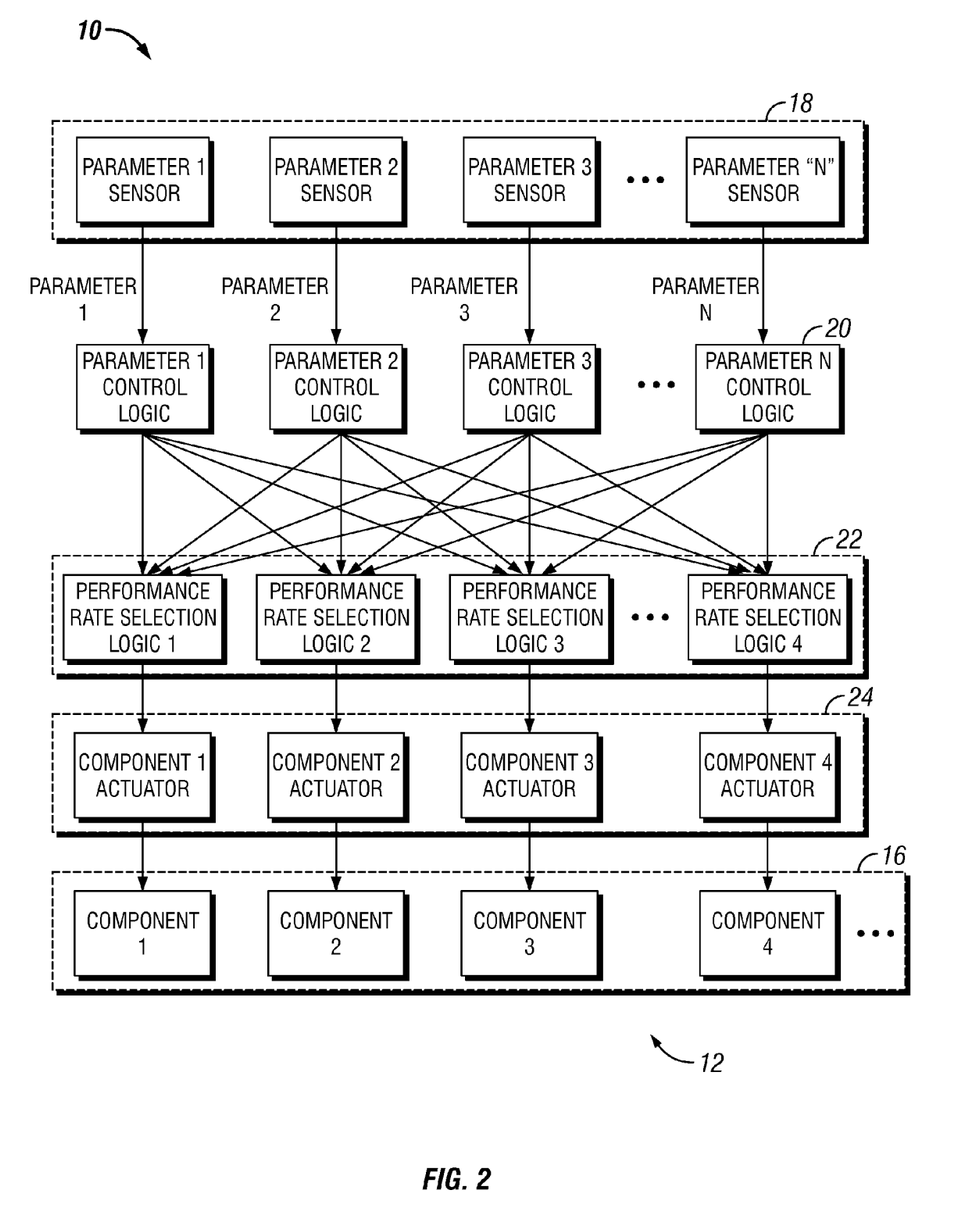
FIG. 2 is another schematic diagram of the control system illustrating the interdependence between the plurality of components and plurality of system parameters.

FIG. 2 is another schematic diagram of the control system 10 illustrating the interdependence between the plurality of components 16 and the plurality of system parameters. While FIG. 1 illustrates how one component 16A can affect the regulation of multiple system parameters, FIG. 2 expands on that concept by illustrating how each system parameter may be regulated by controlling more than one component. For example, a system temperature may be regulated by controlling both processor speed and a fan speed. Furthermore, multiple system parameters, such as temperature, power consumption, and current flow, may be influenced by the respective speeds of multiple components such as processors, fans, memory, I/O adapters, and hard drives.

The sensors 18 provide signals representative of the respective system parameters to the associated control logic 20. The control logic 20 then outputs requested speeds to one or more of a plurality of performance rate selection logic modules 22. In other words, the control logic 20 associated with each parameter may output a set of requested speeds including as many as one speed for each component 16 of the system. The performance rate selection logic 22 associated with each component may then select one of the requested speeds and control each component through the associated component actuator 24 according to the speed selected for that component.

Where multiple components affect a particular system parameter, failure to control one of the components may be compensated for by instead controlling another of the components. If the control logic component tasked with regulating a system temperature does not "win" control over Component 1 by having its requested speed selected, the control logic may still win control over Component 2. For example, if Component 1 were a processor and Component 2 were a fan, and the control logic component for regulating system temperature did not win control over the processor, then the system temperature may instead be regulated by controlling fan speed.

Figure 3:
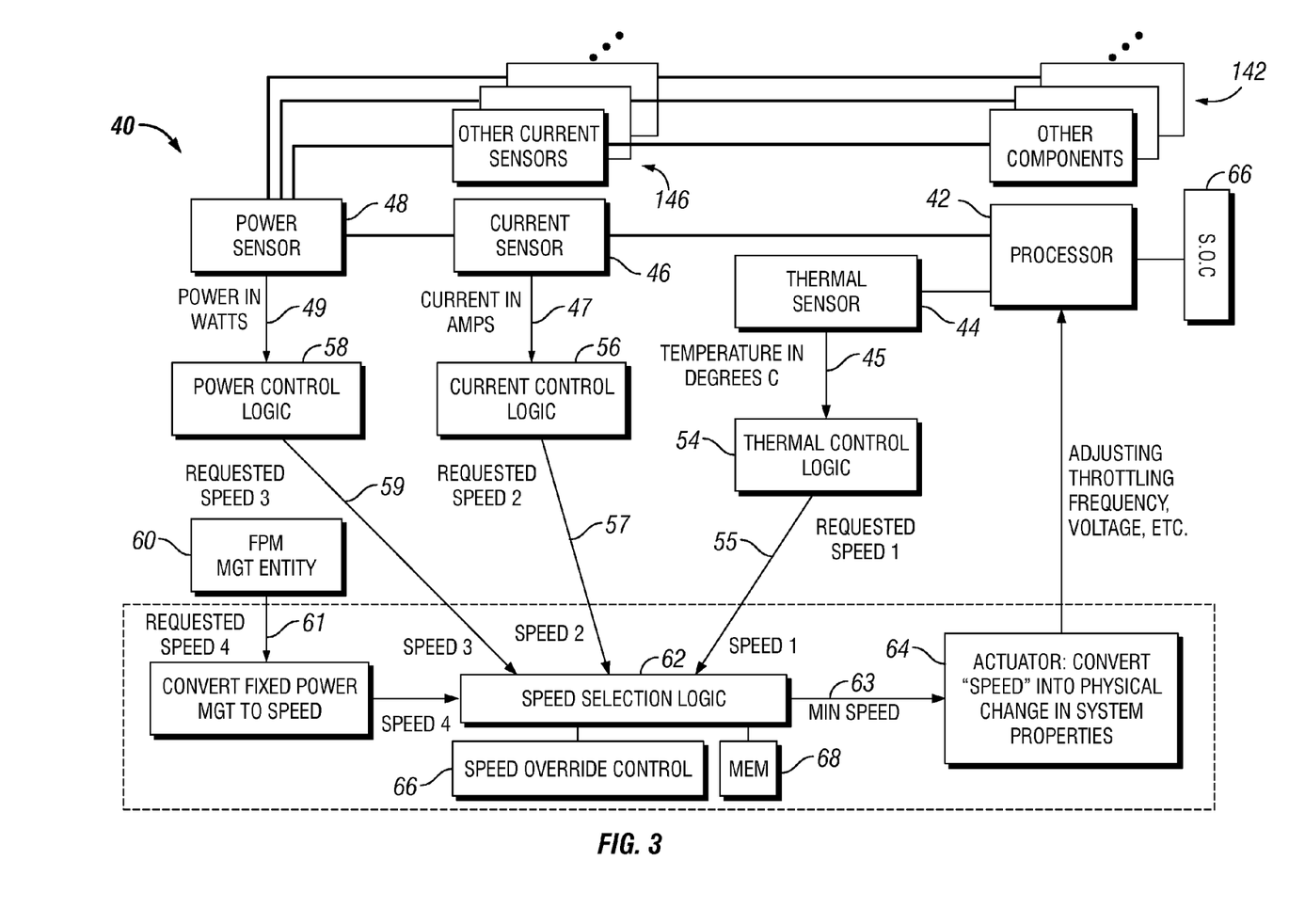
FIG. 3 is a schematic block diagram of an embodiment of the invention in the context of a computer system.

FIG. 3 is a schematic block diagram of an embodiment of the invention in the context of a computer system. A control system 40 according to the invention is configured for controlling a processor 42, e.g. a CPU of the computer system, to regulate a number of system parameters, including processor temperature, current draw by multiple components, and net power consumption of the multiple components. A thermal sensor 44 is configured for dynamically sensing the value of a temperature of the processor 42, such as in "degrees" Celsius, and generating a signal 45 in relation to the sensed temperature. Thermal control logic module 54 in communication with the thermal sensor 44 determines a target performance rate ("requested speed 1") of the processor 42 in relation to the sensed temperature of the processor 42 and generates a signal 55 representative of requested speed 1. A current sensor 46 is configured for dynamically sensing the instantaneous current flowing to the processor 42 and generating a signal 47 in relation thereto. A current control logic module 56 in communication with the current sensor 46 determines a target performance rate ("requested speed 2") of the processor 42 in relation to the sensed current of the processor 42 and generates a signal 57 representative of requested speed 2. Any number of additional components collectively indicated at 142 (e.g. other processors, fans, memory, I/O adapters and hard drives) may also be included, each drawing its own electrical current as sensed by a corresponding plurality of additional current sensors collectively indicated at 146. The combined current flowing to the processor 42 and additional components 142 draws a net power consumption, which is sensed by a power sensor 48. The power sensor 48 dynamically senses the instantaneous net power consumption of the processor 42 and additional components 142, outputting a signal 49 in relation to the sensed net power consumption. A power control logic module 58 in communication with the power sensor 48 determines a target performance rate ("requested speed 3") of the processor 42 in relation to the sensed net power consumption of the processor 42 and additional components 142, generating a signal 59 representative of requested speed 3. Sensors for sensing or monitoring temperature, current flow, power consumption, and so forth are generally known in the art.

As described, some system entities, such as thermal control logic 54, current control logic 56, and power control logic 58, request dynamic (variable) speeds in response to variable system parameters such as temperature, current, and net power. Thus, requested speeds 1, 2, and 3 may vary in response to continuously changing system parameters. Other system entities, by contrast, may request a static (fixed) speed. For example, a fixed power management (FPM) module 60 outputs a signal representative of a target performance rate ("requested speed 4") having a generally fixed value. The speed requested by the FPM module may change in certain circumstances, such as in response to a power supply failure. However, the FPM module is not governed by a control loop.

As previously noted in the generalized embodiment of FIG. 1, it is not a requirement that the system parameters to be regulated are parameters of the component whose performance rate is to be controlled. This is demonstrated by the more particular embodiment of FIG. 3. The power control logic module 56 seeks to control power to the individual processor 42 by regulating the power consumed by the processor 42. By comparison, the FPM control logic module 60 seeks to control power to the entire computer, at least in part, by regulating the power consumed by the processor 42. Thus, the performance rate of the processor 42 affects not only the individual power consumption of the processor 42, but also the net power consumption of the entire computer, because the processor 42 is a component of the computer. Thus, the speed of the processor 42 may be controlled to regulate not only the temperature, current flow, and power consumption of the processor 42, but also the net power consumed by the entire computer, and potentially other system parameters, as well.

The four target performance rates (i.e. "requested speed" 1-4) are input to a speed selection logic 62 for dynamically selecting one of the requested speeds. In this embodiment, the speed selection logic 62 selects the smallest of the four target speeds. The control loop and associated control logic module whose requested speed is selected to control the processor 42 at any given moment may be referred to as the "dominant" control loop and control logic module. The speed selection logic 62 generates a signal 63 representative of the selected speed and outputs the signal 63 to an actuator 64. The actuator 64 sends a signal 65 to the processor 64 to set the speed of the processor 42 substantially equal to the selected speed. For example, the actuator 64 may throttle the processor 42 or adjust the processor's frequency or voltage to operate the processor 42 at the selected performance rate.

The system parameters are variable and, accordingly, the sensor signals 45, 47, 49 and the speed signals 55, 57, 59, 61 are typically dynamic. These signals may change over time intervals on an order of magnitude of milliseconds or even microseconds, and possibly faster as computer technology advances and processor speeds continue to increase. This fast and deterministic speed selection helps ensure that the processor 42 is continuously operated at an acceptable speed in view of the variable system parameters.

The control loop logic for each sensor has a set point based on the input sensor type. For the current control logic module 56, the input signal 47 may be in amperes ("AMPs"). For example, if the setpoint for the current control logic module 56 is 10.5 AMPs, then any deviation from 10.5 AMPs results in attempted corrective action by the current control logic module 54. If the current control logic module 54 determines that the AMPs are too low, such that more AMPs are to be drawn, this will result in requested speed 2 being larger than the present speed setting selected by the speed selection logic 62 and imposed by the actuator 64. For example, if the present current speed was 87% (i.e. 87% of the nominal maximum current), the new requested speed could increase to 89%. The change in requested speed 2 is proportional to the deviation between the present current flow (87%) and the current flow setpoint. However, it should be noted that the increase in requested speed 2 does not necessarily result in an increase in processor speed 42, because the speed selection logic 62 is still constrained to select the smallest speed (at least according to the selection criterion in this embodiment). Thus, a requested speed is only enforced for the dominant control loop at any given moment, regardless of changes in requested speed generated by the control logic module of other control loops in the control system.

A speed adjustment requested by the dominant control loop may not be sufficient, initially, to result in the desired change in the system parameter. For example, if the current control loop is presently dominant, the initially requested speed increase may not result in reaching the setpoint. Rather, the current control loop may continue to increase the requested speed incrementally until the setpoint is reached. This incremental change may result in a longer "settling time" for a system parameter when the workload is not the heaviest. When the workload is closer to its maximum, the control system may respond more quickly to reach the desired set point with a short settling time. Less extreme workloads are generally not as demanding on the control systems, and cause less divergence from the desired control system set points.

Using a working example, the current control logic module 56 may have been calibrated at heavy workloads. Assuming the current control loop is presently dominant, a heavy workload suddenly imposed on the computer may result in 12.5 AMPs suddenly drawn from the system (whereas a more moderate workload might only draw 11 AMPs). The immediate proportional response of the current control loop may be to initiate a speed change request reasonably calculated to reduce the current flow to the processor 42 by about 2 AMPs to a setpoint of 10.5 AMPs. For example, the requested speed 2 might be reduced by the current control loop from 95% to 83% to achieve the desired 2 AMP reduction. By contrast, if a light workload were instead imposed, drawing about 11 AMPs, the speed change request would be smaller, e.g. reduced from 95% to 88%. However, because the feedback gain in this example was calibrated for a heavy workload, the system may actually overcompensate initially by reducing the desired speed from 95% to 88%. The immediate result may be an AMP draw of about 10 AMPs. The control system would then subsequently speed up incrementally, eventually settling in with the processor speed at about 91%, wherein the computer may draw 10.5 AMPs.

Occasionally it may be desirable to override the speed selection logic 62. A speed override control 66 is provided for emergency control of the speed of the processor 42. The speed override control 66 may optionally be in communication with the processor 42 or with the speed selection logic module 62.

A memory module 68 is optionally included. The memory module 68 may track the speeds selected by the speed selection logic module 62, as well as the identity of the control logic module that requested the speed that was selected. Maintaining the identity of the control logic module, management entity, or source of the selected target value or speed improves the system's ability to identify the root cause of abnormal system performance. For example, if the processor is continually being throttled to a low speed, it is beneficial to know that it is the thermal management control logic module that is requesting the low speed because it may lead to a conclusion that the associated temperature sensor has malfunctioned.

The invention can be implemented on existing computer systems having components familiar to one skilled in the art. For example, IBM DIRECTOR is a management system that includes a customizable graphical administrative interface known as a management console, a management server that can support thousands of remote systems at any location, and agent software installed on each of the systems to be managed. IBM Director can interface, for example, with a plurality of rack-based server systems ("rack systems") networked to IBM DIRECTOR via an Internet or Ethernet Network. The IBM POWEREXECUTIVE is a tool available for use with selected IBM BLADECENTER and System X servers that allows direct power monitoring through IBM DIRECTOR. POWEREXECUTIVE helps a system administrator to monitor power consumption to allow better utilization of available power resources. Users can monitor actual power consumption and corresponding thermal loading of BLADECENTER servers. Each rack system may also include a management module known in the art for also managing power, acoustics, and/or thermal limits on the particular rack system. Further still, one or more servers of each rack system may also include a baseboard management controller (BMC). A BMC is a specialized microcontroller typically embedded on the motherboard of many computers, especially servers. Different types of sensors built into the computer system may report to the BMC on parameters such as temperature, cooling fan speeds, power mode or consumption, temperature, operating system status, and more. The BMC monitors the sensors and can send alerts to a system administrator via the network if any of the parameters do not stay within a predefined range of their respective setpoints. The system administrator may also remotely communicate with a BMC using the management console to take corrective action such as resetting or power cycling the server if necessary to restart the server's operating system.

Thus, the networked server system described is one environment that may be configured for management of system parameters according to the invention. A global system management system such as IBM DIRECTOR, a rack-level management module, and server-level BMCs may be configured to provide cooperative management of a plurality of system parameters using a single actuator according to the invention. For example, existing on-board sensors may be used to monitor a plurality of system parameters via the BMC. In addition to the existing array of robust features, the rack-level management module or system-level management console may be reconfigured to also include system parameter control logic modules according to the invention, such as power control logic, current control logic, thermal control logic, and acoustic control logic described above in reference to the embodiments of FIGS. 1 and 2. Each of the control logic modules may identify target component performance rates (requested speeds) for a particular component such as a processor according to established setpoints for each of the associated parameters. A central speed selection logic residing on the networked server system may then dynamically select one of the requested speeds at which to control the target component. Existing component actuators may be used to enforce the selected speed on behalf of the speed selection logic.

It should be recognized that the invention may take the form of an embodiment containing hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 4:
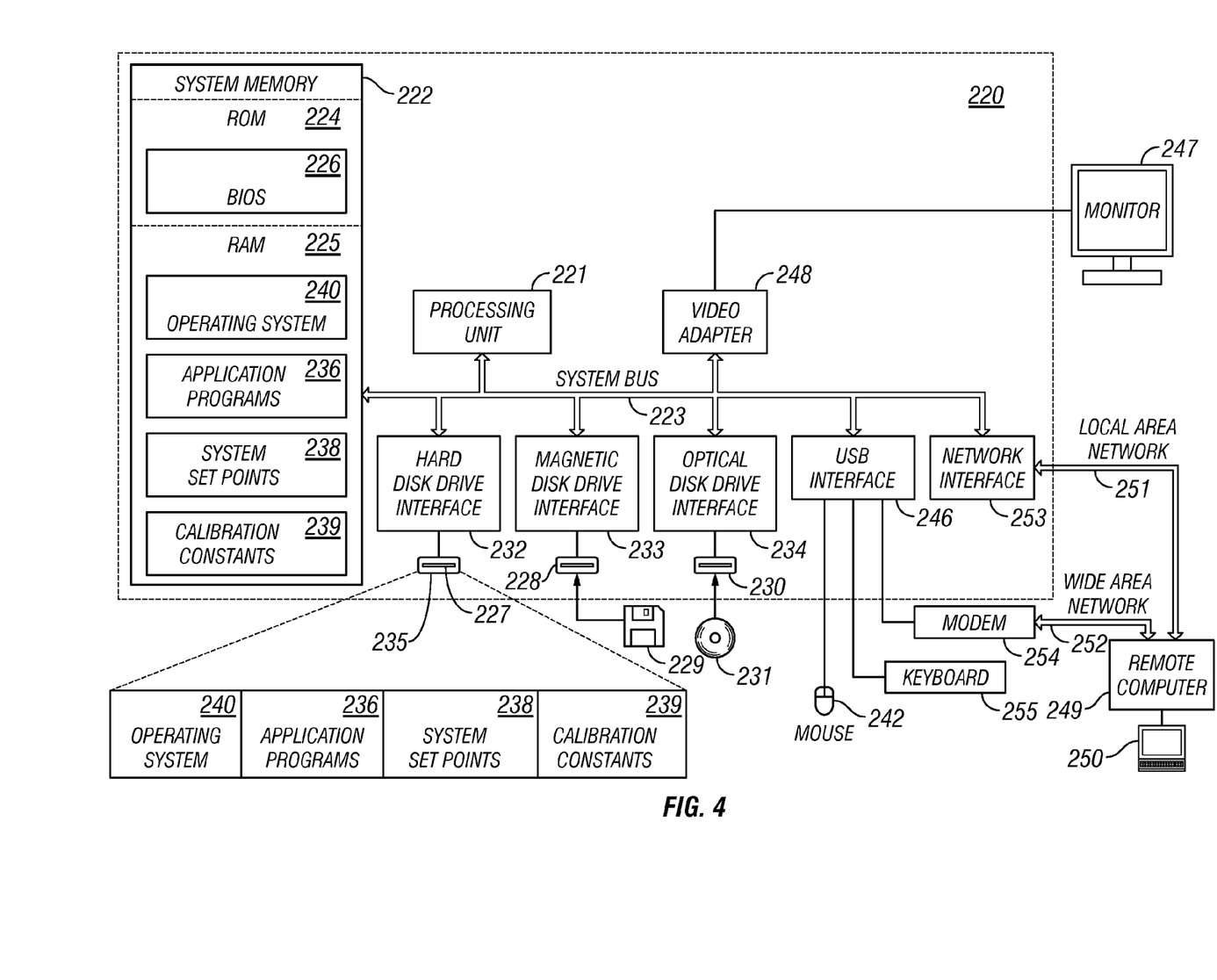
FIG. 4 is a schematic diagram of a computer system that may be configured for regulating system parameters of an electronic system according to an embodiment of the invention.

FIG. 4 is a schematic diagram of a computer system generally indicated at 220 that may be configured for regulating a plurality of system parameters of an electronic system according to an embodiment of the invention. The system parameters to be regulated may include system parameters of the computer system 220, itself, or of another electronic system. The computer system 220 may be a general-purpose computing device in the form of a conventional computer system 220. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

The computer system 220 further includes a hard disk drive 235 for reading from and writing to a hard disk 227, a magnetic disk drive 228 for reading from or writing to a removable magnetic disk 229, and an optical disk drive 230 for reading from or writing to a removable optical disk 231 such as a CD-R, CD-RW, DV-R, or DV-RW. Hard disk drive 235, magnetic disk drive 228, and optical disk drive 230 are connected to system bus 223 by a hard disk drive interface 232, a magnetic disk drive interface 233, and an optical disk drive interface 234, respectively. Although the exemplary environment described herein employs hard disk 227, removable magnetic disk 229, and removable optical disk 231, it should be appreciated by those skilled in the art that other types of computer readable media which can store data that is accessible by a computer, such as magnetic cassettes, flash memory cards, digital video disks, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disk 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 4. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the internet. Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used.

Program modules may be stored on hard disk 227, optical disk 231, ROM 224, RAM 225, or even magnetic disk 229. The program modules may include portions of an operating system 240, application programs 236, or the like. A system setpoints database 238 may be included, which may contain setpoint values for each of the system parameters to be regulated. A calibration constants database 239 may also be included, which may contain proportionality constants or other system-specific data derived for computing target component performance rates (speeds) in relation to observed deviations from setpoint values for each system parameter to be regulated.

Aspects of the present invention may be implemented in the form of application program 236. Application program 236 may be informed by or otherwise associated with system setpoints database 238 and/or calibration constants database 239. The application program 236 generally comprises computer-executable instructions for regulating system parameters according to the invention.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of controlling an electronic system including a plurality of electronic components having a variable performance rate, comprising:

selecting a plurality of target values for the performance rate of a selected electronic component to be controlled, and selecting each target value as a function of a different system parameter, in which one or more of the system parameters are parameters of electronic components other than the selected electronic component;

normalizing the plurality of target values for the performance rate according to a common metric;

dynamically selecting one of the target values for the performance rate according to a predefined selection criterion; and enforcing the dynamically selected target value of the performance rate on the selected electronic component.

2. The method of claim 1, further comprising:

selecting each target value as a function of an amount of deviation between a sensed value of the parameter and a setpoint value associated with the parameter.

3. The method of claim 1, wherein the selected electronic component comprises a processor, and the performance rate of the processor is controlled by one of throttling the processor, adjusting a processor frequency, or adjusting a processor voltage.

4. The method of claim 1, wherein the common metric comprises a scale relating the performance rate of the selected electronic component to a nominal maximum performance rate of the selected electronic component.

5. The method of claim 1, wherein the system parameters include one or more of a power, an electrical current, and a sound level.

6. The method of claim 1, further comprising:
overriding control of the electronic component at the selected value of the performance rate in response to identifying malfunction of a sensor for monitoring a system parameter.

7. A computer program product including computer usable program code embodied on a computer usable storage medium for regulating a plurality of system parameters of an electronic system including a plurality of components having a variable performance rate, the computer usable program code comprising:
computer usable program code for selecting a plurality of target values for the performance rate of a selected electronic component to be controlled, and selecting each target value as a function of a different system parameter, in which one or more of the system parameters are parameters of electronic components other than the selected electronic component to be controlled;
computer usable program code for normalizing the plurality of target values for the performance rate according to a common metric;
computer usable program code for dynamically selecting one of the target values for the performance rate according to a predefined selection criterion; and
computer usable program code for enforcing the dynamically selected target value for the performance rate on the selected electronic component.

8. The computer program product of claim 7, further comprising:
computer usable program code for selecting each target value as a function of an amount of deviation between a sensed value of the parameter and a setpoint value associated with the parameter.

9. The computer program product of claim 7, wherein the selected electronic component comprises a processor, and wherein the performance rate of the processor is controlled by one of throttling the processor, adjusting a processor frequency, or adjusting a processor voltage.

10. The computer program product of claim 7, wherein the common metric comprises a scale relating the performance rate of the selected component to a nominal maximum component performance rate.

11. The computer program product of claim 7, wherein the system parameters include one or more of a power, an electrical current, and a sound level.

12. The computer program product of claim 7, further comprising:
computer usable program code for overriding control of the selected electronic component at the selected value of the performance rate in response to identifying malfunction of a sensor for monitoring a system parameter.

* * * * *